(12) United States Patent
Majumdar et al.

(10) Patent No.: US 9,346,974 B2
(45) Date of Patent: May 24, 2016

(54) FLEXIBLE VISOR HAVING ANTI-FOGGING PROPERTIES AND ANTI-FOGGING COATING COMPOSITIONS

(71) Applicant: SAINT-GOBAIN PERFORMANCE PLASTICS CORPORATION, Solon, OH (US)

(72) Inventors: Debasis Majumdar, Manchester, NH (US); Ryan C. Hirschey, Nashua, NH (US); John P. Russo, Hudson, NH (US); Gerard T. Buss, Bedford, NH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 14/314,241

(22) Filed: Jun. 25, 2014

(65) Prior Publication Data

US 2014/0377566 A1    Dec. 25, 2014

Related U.S. Application Data

(60) Provisional application No. 61/839,299, filed on Jun. 25, 2013.

(51) Int. Cl.
| | |
|---|---|
| C09K 3/18 | (2006.01) |
| C09D 7/12 | (2006.01) |
| C09D 167/00 | (2006.01) |
| C09D 175/04 | (2006.01) |
| B32B 33/00 | (2006.01) |
| B32B 27/08 | (2006.01) |

(52) U.S. Cl.
CPC .............. *C09D 175/04* (2013.01); *B32B 27/08* (2013.01); *B32B 33/00* (2013.01); *B32B 2250/05* (2013.01); *B32B 2250/24* (2013.01); *B32B 2250/246* (2013.01); *B32B 2255/10* (2013.01); *B32B 2255/26* (2013.01); *B32B 2307/412* (2013.01); *B32B 2551/00* (2013.01); *C09D 167/00* (2013.01); *C09K 3/18* (2013.01); *Y10T 428/3158* (2015.04)

(58) Field of Classification Search
None
See application file for complete search history.

(56) References Cited

U.S. PATENT DOCUMENTS

| | | | |
|---|---|---|---|
| 4,775,658 A | | 10/1988 | Matsuda et al. |
| 5,846,650 A | * | 12/1998 | Ko .......................... G02B 1/105 296/84.1 |
| 5,877,254 A | | 3/1999 | La Casse et al. |

(Continued)

OTHER PUBLICATIONS

The International Search Report and the Written Opinion received from the International Searching Authority (ISA/KR) for International Application No. PCT/US2014-044024, dated Oct. 20, 2014, 12 pages.

(Continued)

*Primary Examiner* — Ramsey Zacharia
(74) *Attorney, Agent, or Firm* — Abel Law Group, LLP; Thomas Osborn (57) ABSTRACT

The present disclosure is directed to transparent composites having anti-fogging properties and anti-fog coating compositions for providing anti-fogging properties. The anti-fogging layers can contain an adhesive polymer, a hard polymer, and a hydrophilic polymer, wherein the adhesive polymer, hard polymer, and hydrophilic polymers are different. In further embodiments, composites are described including a substrate layer; a first adhesive layer; a first transparent layer; a second adhesive layer; a second transparent layer; and an anti-fog layer.

19 Claims, 1 Drawing Sheet

(56) References Cited

U.S. PATENT DOCUMENTS

| | | |
|---|---|---|
| 2003/0203991 A1 | 10/2003 | Schottman et al. |
| 2005/0153106 A1* | 7/2005 | Lansberry .............. B32B 17/10 428/195.1 |
| 2006/0078718 A1 | 4/2006 | Konrad et al. |
| 2009/0246513 A1 | 10/2009 | Laroche et al. |
| 2012/0049401 A1 | 3/2012 | Schneider et al. |
| 2012/0308828 A1 | 12/2012 | Iwazumi et al. |

OTHER PUBLICATIONS

LUDOX Colldodal Silica, Grace Materials Technologies, 2012 (Brochure), W.R. Grace & Co.-Conn, see p. 6.

* cited by examiner

FLEXIBLE VISOR HAVING ANTI-FOGGING PROPERTIES AND ANTI-FOGGING COATING COMPOSITIONS

CROSS-REFERENCE TO RELATED APPLICATION

This application claims priority under 35 U.S.C. §119(e) to U.S. Provisional Application No. 61/839,299 entitled "FLEXIBLE VISOR HAVING ANTI-FOGGING PROPERTIES AND ANTI-FOGGING COATING COMPOSITIONS," by Majumdar et al., filed Jun. 25, 2013, and is hereby incorporated by reference in its entirety.

FIELD OF THE DISCLOSURE

The present disclosure relates to visors having anti-fogging properties and anti-fogging coating compositions, and more particularly to, visors having anti-fogging properties and anti-fogging coating compositions using a combination of different polymers.

RELATED ART

Anti-fogging compositions and visors containing anti-fogging compositions are known in the art. For example, polyurethane coating compositions having hydrophilic properties have been used to provide anti-fogging effects. However, hydrophilic polyurethanes are often soft and tacky, leading to undesirable sticking of the anti-fogging coating layer to various surfaces. Such tackiness can cause delamination of the coated layer from the substrate during coating, assembly or actual use of a flexible composite visor. Moreover, characteristics such as transparency, haze, hardness, scratch resistance are traditionally negatively affected when attempting to improve the drawbacks of using solely hydrophilic polyurethanes.

Accordingly, new visor composites exhibiting anti-fogging properties which do not delaminate and have good hardness with excellent transparency are still needed.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the transparent, anti-fogging composite arts.

The following disclosure describes anti-fogging compositions and composites having anti-fogging compositions, where the anti-fogging composition comprises a novel combination of at least three different polymers which the current inventors have surprisingly discovered result in synergistic improvement in characteristics including anti-fogging, mechanical strength, adhesion, and transparency. The composites can particularly be useful for applications including visors, windows, and the like. The concepts are better understood in view of the embodiments described below that illustrate and do not limit the scope of the present invention.

Figure 1:
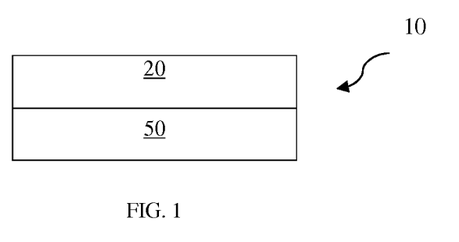
FIG. 1 includes a cross-section illustration of a composite visor according to one embodiment of the present disclosure.

One embodiment of the present disclosure is directed to a composite 10 which includes a substrate layer 20 and an anti-fog layer 50 as illustrated in FIG. 1. The anti-fog layer 50 can be disposed directly adjacent the substrate layer 20. In other embodiments, as will be discussed in more detail below, the composite can contain additional intervening layers between the substrate layer 20 and the anti-fog layer 50, and further layers above or below the substrate layer 20 and anti-fog layer 50. Generally, the anti-fog layer 50 will be an external layer of the composite and exposed to an environment. In certain embodiments, the anti-fog layer will be disposed in the composite such that it is adapted to face a human user. For example, one form of the composite, as discussed in more detail below, is a visor construct, and the anti-fog layer may be disposed within the layering of the composite such that it is adapted to face the user.

Figure 2:
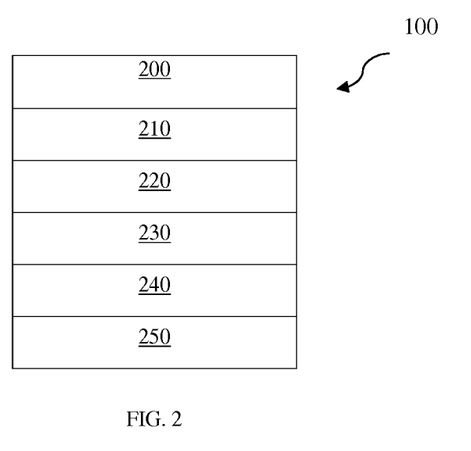
FIG. 2 includes a cross-section illustration of a composite visor according to another embodiment of the present disclosure.

One particular example of a composite having additional layers is illustrated in FIG. 2. The composite 100 can contain a substrate layer 200; a first adhesive layer 210; a first transparent layer 220; a second adhesive layer 230; a second transparent layer 240; and an anti-fog layer 250. Each of the aforementioned layers can directly contact each other in the arrangement as shown in FIG. 2. Additionally, in other embodiments, further layers can be disposed in between the layers illustrated in FIG. 2. As discussed above, traditionally, the anti-fog layer in the context of visor constructs, can be adapted to face a user when in use. As such, in particular embodiments, the anti-fog layer 250 can be directly adjacent to and contacting the second transparent layer 240. Other particular embodiments of the present disclosure are directed to anti-fog coating compositions. Such anti-fog coating compositions can contain a cross-linkable network of polymers comprising an adhesive polymer, a hard polymer, and a hydrophilic polymer, wherein the adhesive polymer, hard polymer, and hydrophilic polymer are different.

Examples and characteristics of certain layers of the composite and constituents of the anti-fog layer will now be described. It is to be understood that any description of the anti-fog coating layer also applies to the anti-fog coating compositions.

The substrate layer can be a multitude of different materials, including, for example, transparent plastics, glass, metals or ceramics. In a preferred embodiment, the substrate is flexible. For example, a flexible substrate, is a substrate which can be repeatedly bent or flexed without breaking. In certain embodiments, the substrate can include flexible plastic materials such as polyester including polyethylene terephthalate (PET), polyethylene naphthalate (PEN), polyester ionomer, amorphous polyester such as amorphous glycol modified PET (PETG), polyethersulfone (PES), polycarbonate (PC), polysulfone, a phenolic resin, an epoxy resin, polyetherester, polyetheramide, cellulose nitrate, cellulose acetate, such as cellulose triacetate (TAC), poly(vinyl acetate), polystyrene, polyolefins including polyolefin ionomers, polyamide, polyurethanes, polythiourethanes, polyacrylonitrile, poly(methyl (x-methacrylates), an aliphatic or cyclic polyolefin, polyarylate (PAR), polyetherimide (PEI), polyethersulphone (PES), polyimide (PI), poly(ether ether ketone) (PEEK), poly(ether ketone) (PEK), and poly(methyl methacrylate) and various acrylate/methacrylate copolymers (PMMA), polyvinyl chloride (PVC), various fluoropolymers, various silicone based polymers, voided polymers including polymeric foam, microvoided polymers and microporous materials, fabric, or any combinations thereof. In particular embodiments, polyolefins may include high density polyethylene (HDPE), low density polyethylene (LDPE), and polypropylene, including oriented polypropylene (OPP). Cyclic polyolefins may include poly(bis(cyclopentadiene)). Examples include Artong made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer.

In further particular embodiments, polyesters may include those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Examples of particular cycloaliphatic, aliphatic and aromatic polyesters include poly(ethylene terephthalate), poly(cyclohexlenedimethylene), terephthalate)poly(ethylene dodecate), poly(butylene terephthalate), poly(ethylene naphthalate), poly(ethylene(2,7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel) (cis), and poly(1,4-cyclohexylene dimethylene terephthalate (Kodel) (trans). In particular embodiments, the polyester compounds can be polyester compounds prepared from the condensation of a diol and an aromatic dicarboxylic acid. Illustrative of such aromatic carboxylic acids are terephthalic acid, isophthalic acid and an α-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphonedicarboxylic acid, 1,1,3-trimethyl-5-carboxy-3-(p-carboxyphenyl)-idane, diphenyl ether 4,4'-dicarboxylic acid, bis-p(carboxy-phenyl)methane, and the like. In even more particular embodiments, the aforementioned aromatic dicarboxylic acids can include those based on a benzene ring (such as terephthalic acid, isophthalic acid, orthophthalic acid). Amongst these acid precursors, terephthalic acid is a particular acid precursor.

The fluoropolymers can include polytetrafluoroethylene (PTFE), perfluoroalkoxy polymer (PFA), fluorinated ethylene-propylene (FEP), copolymer of tetrafluoroethylene, hexafluoropropylene and vinylidene fluoride (THV), copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) containing specialties, polyethylenetetrafluoroethylene (ETFE), polyvinylidene fluoride (PVDF), polyvinylfluoride (PVF), polyethylenechlorotrifluoroethylene (ECTFE), polychlorotrifluoroethylene (PCTFE), poly(ethylene tetrafluoroethylene)fluoropolymer (PETFE), and combinations thereof. Fluoropolymers, in particular, are very difficult substrates on which to adhere any layer, particularly an anti-fogging layer without risks of delamination. One particular advantage of certain embodiments of the composites described herein is the excellent adherability or bondability of the fluoropolymer layer. This feature is also described in terms of its ability to not delaminate.

In certain embodiments, the polyvinyl chloride material can be derived from the polymerization of the monomer vinyl chloride by any suitable techniques such as suspension polymerization, emulsion polymerization or bulk polymerization. The polyvinyl chloride material may include chlorinated polyvinyl chloride with increased chlorine content. For desired physical and chemical properties and ease of processability the polyvinyl chloride material may comprise addenda such as heat stabilizers, UV stabilizers, lubricants, plasticizers, processing aids, impact modifiers, thermal modifiers, fillers, flame retardants, biocides, blowing agents and smoke suppressors, and, optionally pigments.

In very particular embodiments, the substrate materials can include polyvinyl chloride; polyesters such as PET, PEN, PETG, polyester ionomers; polycarbonates; fluoropolymers such as ETFE, PFA, FEP, PVDF, THV and PVF; polyolefins such as PE and PP; polyurethanes; cellulose acetates; and glass.

In certain embodiments, when used, the flexible plastic substrate can be reinforced with a hard coating. Typically, the hard coating is an acrylic coating. Such a hard coating typically has a thickness of from 1 to 15 microns, such as from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly useful hard coating is the coating known as "Lintec." Lintec contains UV cured polyester acrylate and colloidal silica. When deposited on Arton, it has a surface composition of 35 atom % C, 45 atom % O, and 20 atom % Si, excluding hydrogen. Another particularly useful hard coating is the acrylic coating sold under the trademark "Terrapin" by Tekra Corporation, New Berlin, Wis.

Referring again to FIG. 2, certain embodiments can include additional polymer layers in the composite other than the substrate layer. In such embodiments, the composite can contain an adhesive layer, such as between any of the polymer layers.

In certain embodiments, the adhesive layer can include one or more of a water soluble polymer, a hydrophilic colloid or a water insoluble polymer, latex or dispersion. In particular embodiments, the adhesive layer can contain a polymer or interpolymer prepared from ethylenically unsaturated monomers such as styrene, styrene derivatives, acrylic acid or methacrylic acid and their derivatives, olefins, (meth)acrylonitriles, itaconic acid and its derivatives, maleic acid and its derivatives, vinyl halides, vinyl acetate, vinylidene halides, epoxies, urethanes, imines, polyesters, fluoropolymers, or combinations thereof.

Particularly suitable fluoropolymers can include polytetrafluoroethylene (PTFE), perfluoroalkoxy polymer (PFA), fluorinated ethylene-propylene (FEP), copolymer of tetrafluoroethylene, hexafluoropropylene and vinylidene fluoride (THV), polyethylenetetrafluoroethylene (ETFE), polyvinylidene fluoride (PVDF), polyvinylfluoride (PVF), polyethylenechlorotrifluoroethylene (ECTFE), polychlorotrifluoroethylene (PCTFE), and combinations thereof.

In particular embodiments, the adhesive layer can be prepared from an aqueous dispersion of condensation polymers such as, for example, polyurethanes and polyesters.

It is also useful to describe the constituents of the adhesive layer in terms of its glass transition temperature. In particular embodiments, the adhesive layer can include a polymer having a glass transition temperature ($T_g$) of no greater than 60 degrees Celsius, no greater than 20 degrees Celsius, no greater than 10 degrees Celsius, and even no greater than 0 degrees Celsius. These glass transition temperatures ensure sufficient flow of the adhesive layer during lamination.

Another way to describe the adhesive layer is through a quantification of its adhesive effect through a peel strength test. The peel strength can be measured according to ASTM D1876. In certain embodiments, the first adhesive layer, the second adhesive layer, or combinations thereof can have peel strength of at least about 2 pounds per linear inch (PLI), at least about 3 PLI, at least about 4 PLI, or even at least about 5 PLI between adjoining sheets. In particular, the adjoining sheets can be those described herein such as the substrate layer, the first transparent layer, the second transparent layer, or combinations thereof.

The adhesive layer can have a thickness of at least 0.1 micrometers, at least 0.5 micrometers, or even at least 1 micrometer. The adhesive layer can have a thickness of no greater than 100 micrometers, no greater than 50 micrometer, no greater than 10 micrometers, or even no greater than 8 micrometers. Moreover, the adhesive layer can have a thickness in a range of any of the maximum and minimum values described above, such as about 0.1 micrometers to about 100 micrometers, about 0.5 micrometers to about 50 micrometers, or even about 1 micrometer to about 10 micrometers.

As discussed above, the composite can contain additional layers other than the substrate layer, such as a first transparent layer and a second transparent layer. The first transparent layer and/or the second transparent layer can be a multitude of different materials, including those described for the substrate layer. In certain embodiments, the first transparent layer and the second transparent layer can contain the same material. In other embodiments, the first transparent layer and the second transparent layer can be different. In particular embodiments, the first and/or second transparent layers can contain a polymer. However, it is to be understood that the first and/or second transparent layers can be include glass, ceramic, metals or any other suitable material for any reason. For example, the first and second transparent layers can be any of the materials described above for the substrate layer.

The first transparent layer and/or the second transparent layer can include, for example, transparent plastics such as those described herein above as the substrate layer. In particular embodiments, the first transparent layer and/or the second transparent layer is the same as described for the substrate layer herein above. Most preferred materials for the first transparent layer and/or the second transparent layer include polyvinyl chloride; polyesters such as PET, PEN, PETG, polyester ionomers; polycarbonates; fluoropolymers such as ETFE, PFA, FEP, THV; polyolefins such as PE and PP; cellulose acetates; and glass.

The substrate layer and/or the first transparent layer and/or the second transparent layer can be produced by any means known in the art such as, extrusion, coextrusion, molding, blow molding, orientation, lamination, casting, calendaring, coating, thermo-forming, and the like. In a preferred embodiment the substrate layer and/or the first transparent layer and/or the second transparent layer can contain a free standing sheet.

The substrate layer and/or the first transparent layer and/or the second transparent layer can comprise any additives such as charge control agents, conductive particles or polymers, crosslinking agents or hardeners, soluble and/or solid particle dyes, anti-foggants, inorganic or organic fillers, dispersants, lubricants, plasticizers, antioxidants, voiding agents, colorants or tints, roughening agent, slip agent, UV absorbers, refractive index matching material, release agents, flame retardants, and others well-known in the art.

In particular embodiments, the substrate layer and/or the first transparent layer and/or the second transparent layer, and particularly the fluoropolymer layer, can have any number of primers or surface treatment to improve coatability and/or adhesion. Such primers can include acrylics, polyurethanes, polyesters, vinylidene halides, polyolefines, epoxies, silanes and the like. Surface treatments can include flame, plasma and corona discharge treatment, ultraviolet radiation treatment, ozone treatment, electron beam treatment, chemical treatment and the like.

A particularly useful surface treatment preferred for fluoropolymer surface is the C-treatment, which refers to a method for modifying the surface by corona treatment in the presence of a solvent gas such as acetone. Not to be limited by theory, the method has been found to provide strong interlayer adhesion between a modified fluoropolymer and a non fluoropolymer interface (or a second modified fluoropolymer). C-treatment has been described in U.S. Pat. No. 6,726,979 and references therein, the teachings of which are incorporated herein in their entirety for all purposes.

The anti-fog layer can contain one or more polymers. In certain embodiments, the anti-fog layer can contain can contain at least two different polymers, at least three different polymers, or even at least four different polymers. In a preferred embodiment, the antifog layer contains a crosslinked network of the different polymers.

It is helpful to describe the polymers within the anti-fog layer in terms of certain material properties. In particular embodiments the anti-fog layer can contain a hydrophilic polymer, an adhesive polymer, and a hard polymer in which each polymer is different.

The hydrophilic polymer of the anti-fog layer can include, for example, a polyvinyl alcohol, polyvinyl acetal, polyvinyl acetate, polyvinylpyrrolidone, polyethylene oxide, polyacrylamide, polyester, polyurethane, cellulose acetate, hydroxyethyl cellulose, hydroxymethyl cellulose or gelatin or blends or copolymers thereof. The hydrophilic polymer can be a polymer having a backbone and hydrophilic segments covalently bonded to the backbone.

The hydrophilic segments can include alkylene oxides, lactones, lactams, silanes, acrylamides, alcohols, gelatin, or combinations thereof. In particular embodiments, the hydrophilic segments include alkylene oxides, lactones, lactams, or combinations thereof.

The hydrophilic segments can have a molecular weight of at least about 100, at least about 500, or even at least about 1000. Further, the hydrophilic segments can have a molecular weight of no greater than about 100000, no greater than about 50000, or even no greater than about 10000. Moreover, the hydrophilic segments can have a molecular weight in a range of any of the maximum and minimum values described above, such as, about 100 to about 100000, about 500 to about 50000, or even about 1000 to about 10000.

The hydrophilic segments can be at least about 1 wt %, at least about 10 wt %, or even at least about 25 wt % by weight of the hydrophilic polymer. Further, the hydrophilic segments can be no greater than about 95 wt %, no greater than about 75 wt %, or even no greater than about 50 wt %. Moreover, the hydrophilic segments can contain a weight percentage of the hydrophilic polymer in a range of any of the maximum and minimum values described above, such as, about 1 wt % to about 95 wt %, about 10 wt % to about 75 wt %, or even about 25 wt % to about 50 wt %.

The hydrophilic polymer can be present in the anti-fog layer in an amount of no greater than about 99.9 wt %, no greater than about 90 wt %, no greater than about 80 wt %, or even no greater than about 70 wt % based on the total dry weight of the anti-fog layer. In further embodiments, the hydrophilic polymer can be present in the anti-fog layer in an amount of at least about 0.01 wt %, at least about 10 wt %, at least about 20 wt %, or even at least about 25 wt % based on the total dry weight of the anti-fog layer. Moreover, the hydrophilic polymer can be present in the anti-fog layer in an amount in a range of any of the maximum and minimum values described above, such as about 0.01 wt % to about 99.9 wt %, about 10 wt % to about 90 wt %, about 20 wt % to about 80 wt %, or even about 25 wt % to about 75 wt % based on the total dry weight of the anti-fog layer.

Further, in certain embodiments, the hydrophilic polymer can be the primary polymer in the anti-fog layer. For example, the hydrophilic polymer can be present in the anti-fog layer in an amount greater than the adhesive polymer, hard polymer, or a combination thereof.

The adhesive polymer can include one or more of a water soluble polymer, a hydrophilic colloid or a water insoluble polymer, latex or dispersion. In particular embodiments, the adhesive polymer can be a polymer or interpolymer prepared from ethylenically unsaturated monomers such as styrene, styrene derivatives, acrylic acid or methacrylic acid and their derivatives, olefins, (meth)acrylonitriles, itaconic acid and its derivatives, maleic acid and its derivatives, vinyl halides, vinyl acetate, vinylidene halides, epoxies, urethanes, imines, polyesters, fluoropolymers, or combinations thereof. Particularly suitable fluoropolymers can include polytetrafluoroethylene (PTFE), perfluoroalkoxy polymer (PFA), fluorinated ethylene-propylene (FEP), copolymer of tetrafluoroethylene, hexafluoropropylene and vinylidene fluoride (THV), polyethylenetetrafluoroethylene (ETFE), polyvinylidene fluoride (PVDF), polyvinylfluoride (PVF), polyethylenechlorotrifluoroethylene (ECTFE), polychlorotrifluoroethylene (PCTFE), and combinations thereof.

In particular embodiments, the adhesive polymer can be prepared from an aqueous dispersion of condensation polymers such as, for example, polyurethanes and polyesters.

It is also useful to describe the adhesive polymer in terms of its glass transition temperature. In particular embodiments, the adhesive polymer can have a glass transition temperature ($T_g$) of no greater than 60 degrees Celsius, no greater than 20 degrees Celsius, no greater than 10 degrees Celsius, and even no greater than 0 degrees Celsius. These glass transition temperatures ensure sufficient flow of the polymer during lamination.

Another way to describe the adhesive polymer is through a quantification of its adhesive effect through a peel strength test. The peel strength is measured according to ASTM D1876. In certain embodiments, the adhesive polymer can have a peel strength of at least about 2 pounds per linear inch (PLI), at least about 3 PLI, at least about 4 PLI, or even at least about 5 PLI between adjoining sheets.

In certain embodiments, the adhesive polymer can be present in the anti-fog layer in an amount of no greater than about 90 wt %, no greater than about 80 wt %, no greater than about 70 wt %, or even no greater than about 60 wt % based on the total dry weight of the anti-fog layer. In further embodiments, the adhesive polymer can be present in an amount of at least about 0.1 wt %, at least about 10 wt %, at least about 20 wt %, or even at least about 25 wt % based on the total dry weight of the anti-fog layer. Moreover, the adhesive polymer can be present in the anti-fog layer in an amount in a range of any of the maximum and minimum values described above, such as about 0.1 wt % to about 90 wt %, about 10 wt % to about 80 wt %, about 20 wt % to about 70 wt %, or even about 25 wt % to about 60 wt % based on the total dry weight of the anti-fog layer.

In further embodiments, the anti-fog layer can further include a hard polymer. The hard polymer can provide mechanical strength to the anti-fog layer and also aid in improving the scratch resistance of the anti-fog layer.

In certain embodiments, the hard polymer can include a water soluble polymer, a hydrophilic colloid or a water insoluble polymer, latex or dispersion. In particular embodiments, the hard polymer can be a polymer or interpolymer prepared from ethylenically unsaturated monomers such as styrene, styrene derivatives, acrylic acid or methacrylic acid and their derivatives, olefins, (meth)acrylonitriles, itaconic acid and its derivatives, maleic acid and its derivatives, vinyl halides, vinyl acetate, vinylidene halides, epoxies, urethanes, imines, polyesters, fluoropolymers, or combinations thereof. Particularly suitable fluoropolymers can include polytetrafluoroethylene (PTFE), perfluoroalkoxy polymer (PFA), fluorinated ethylene-propylene (FEP), copolymer of tetrafluoroethylene, hexafluoropropylene and vinylidene fluoride (THV), polyethylenetetrafluoroethylene (ETFE), polyvinylidene fluoride (PVDF), polyvinylfluoride (PVF), polyethylenechlorotrifluoroethylene (ECTFE), polychlorotrifluoroethylene (PCTFE), and combinations thereof.

In certain further embodiments, the hard polymer can include an aqueous dispersion of condensation polymers such as polyurethanes and polyesters.

It is also useful to describe the hard polymer in terms of its hardness. Hardness can be quantified using a pencil hardness test, measured according to ASTM D3363. In the embodiments described herein, the hard polymer can have a pencil hardness of at least about H, at least about 2H, at least about 3H as measured according to ASTM D3363. Further, the hard polymer can have a pencil hardness of no greater than about 9H, no greater than about 8H, no greater than about 7H, no greater than about 6H, or even no greater than about 5H as measured according to ASTM D3363. Moreover, the hard polymer can have a pencil hardness in a range of any of the maximum and minimum values described above, such as, from about H to about 9H, from about 2H to about 8H, or even from about 3H to about 7H as measured according to ASTM D3363.

Another useful property to describe the hard polymer is its 100% modulus. In particular embodiments, the hard polymer can have a 100% modulus of at least about 2000 psi, at least about 3000 psi, or even at least about 3500 psi as measured according to ASTM D412. In further embodiments, the hard polymer can have a 100% modulus of no greater than about 15000 psi, no greater than about 10000 psi, or even no greater than about 7500 psi as measured according to ASTM D412. Moreover, the hard polymer can have a 100% modulus in a range of any of the maximum and minimum values described above, such as, from about 2000 psi to about 15000 psi, from about 3000 psi to about 10000 psi, or even from about 3500 psi to about 7500 psi as measure according to ASTM D412.

Still yet another useful characteristic to describe the hard polymer is its tensile strength. In particular embodiments, the hard polymer can have a tensile strength of at least about 3000 psi, at least about 4000 psi, or even at least about 5000 psi as measured according to ASTM D412. In further embodiments, the hard polymer can have a tensile strength of no greater than about 15000 psi, no greater than about 1000 psi, or even no greater than about 7500 psi as measured according to ASTM D412. Moreover, the hard polymer can have a tensile strength in a range of any of the maximum and minimum values described above, such as, from about 3000 psi to about 15000 psi, from about 4000 psi to about 10000 psi, or even from about 5000 psi to about 7500 psi as measured according to ASTM D412.

Still yet another useful characteristic to describe the hard polymer is its % elongation at break. In particular embodiments, the hard polymer can have a % elongation at break of at least 100% at break, at least about 200% at break, or even at least about 300% at break as measured according to ASTM D412. In further embodiments, the hard polymer can have a % elongation at break of no greater than 1000% elongation at break, no greater than 700% elongation at break, or even no greater than 500% elongation at break as measured according to ASTM D412. Moreover, the hard polymer can have % elongation at break in a range of any of the maximum and minimum values described above, such as from about 100% to about 1000%, from about 200% to about 700%, or even from about 300% to about 500% elongation at break as measured according to ASTM D412.

In certain embodiments, the hard polymer can be present in the anti-fog layer in an amount of no greater than about 90 wt %, no greater than about 80 wt %, no greater than about 70 wt %, or even no greater than about 60 wt % based on the total dry weight of the anti-fog layer. In further embodiments, the hard polymer can be present in an amount of at least about 0.1 wt %, at least about 10 wt %, at least about 20 wt %, or even at least about 25 wt % based on the total dry weight of the anti-fog layer. Moreover, the hard polymer can be present in the anti-fog layer in an amount in a range of any of the maximum and minimum values described above, such as about 0.1 wt % to about 90 wt %, about 10 wt % to about 80 wt %, about 20 wt % to about 70 wt %, or even about 25 wt % to about 60 wt % based on the total dry weight of the anti-fog layer.

In very particular embodiments, the anti-fog coating composition and the anti-fog layer can further include one more anti-blocking agents. In particular embodiments, the anti-blocking agents can include colloidal inorganic particles, such as a colloidal silica and/or a surfactant.

In certain embodiments, the colloidal silica compound can contain a nanoparticle. Further, in certain embodiments, the colloidal silica compound can be generally transparent. Particular examples of a suitable colloidal silica can include Ludox AM, which is commercially available from WR Grace Co.

When used, the colloidal silica can be present in the anti-fog coating composition or the anti-fog layer in an amount of at least about 1 wt. %, at least about 3 wt. %, or even at least about 7 wt. %, based on the total weight of the anti-fog coating composition or the anti-fog layer. In further embodiments, the colloidal silica can be present in the anti-fog coating composition or the anti-fog layer in an amount of no greater than about 50 wt. %, no greater than about 40 wt. %, no greater than about 30 wt. %, or even no greater than about 20 wt. %. In still further embodiments, the colloidal silica can be present in the anti-fog coating composition or the anti-fog layer in an amount in a range of any of the minimum and maximum values provided above, such as in a range of from about 1 wt. % to about 50 wt. %, about 3 wt. % to about 40 wt. %, or even about 7 wt. % to about 30 wt. %.

Regarding the surfactant, it particular embodiments, the surfactant can include a fluorinated surfactant. Furthermore, in certain embodiments, the surfactant can include an anionic surfactant. In very particular embodiments, the surfactant can include a fluorinated anionic surfactant. Suitable examples of fluorinated anionic surfactant can include Capstone FS-61 available from DuPont™.

In certain embodiments the surfactant can be present in the anti-fog coating composition or the anti-fog layer in an amount of at least about 0.005 wt. %, at least about 0.01 wt. %, or even at least about 0.03 wt. %, based on the total weight of the anti-fog coating composition or the anti-fog layer. In further embodiments, the surfactant can be present in the anti-fog coating composition or the anti-fog layer in an amount of no greater than about 15 wt. %, no greater than about 10 wt. %, no greater than about 8 wt. %, or even no greater than about 2 wt. %. In still further embodiments, the surfactant can be present in the anti-fog coating composition or the anti-fog layer in an amount in a range of any of the minimum and maximum values provided above, such as in a range of from about 0.005 wt. % to about 15 wt. %, about 0.01 wt. % to about 10 wt. %, or even about 0.03 wt. % to about 8 wt. %.

A particular advantage of certain embodiments of the present disclosure is the unexpected discovery that the anti-blocking agents described above were able to significantly reduce the blocking (also commonly referred to as stickiness or tackiness) of the anti-fog coating layer. Such anti-blocking effects are particularly desirable when the composite structure containing the anti-fog layer is folded such that two surfaces containing the anti-fog layer touch, such as in packaged personal protective equipment. In the absence of the anti-blocking agents described above, such situations could result in the two surfaces sticking together and damaging the anti-fog layer when separated, and particularly when the composite structure is stored at an elevated temperature, above room temperature. As shown in more detail in the examples below, it was unexpectedly discovered that the anti-blocking agents described above served to significantly reduce blocking. Accordingly, in certain particular embodiments of the present disclosure, an anti-fog layer and/or an anti-fog coating composition can contain a hydrophilic polymer and an anti-blocking agent comprising colloidal silica and/or an anionic fluorinated surfactant. Thus it is to be understood that in certain embodiments, the hard polymer and/or the adhesive polymer can be optional.

In forming the anti-fog layer or the first and the second adhesive layer, the composition can be solventborne or waterborne. For environmental reasons waterborne compositions are preferred. By waterborne it is meant that the coating medium comprises at least 50% by weight of water.

The coating composition(s) or the coated layer(s) can include any number of additives for a variety of different reason. These additives can include surfactants, defoamers or coating aids, charge control agents, conductive particles or polymers, thickeners or viscosity modifiers, coalescing aids, crosslinking agents or hardeners, soluble and/or solid particle dyes, anti-foggants, inorganic or organic fillers, matte beads, inorganic or polymeric particles, adhesion promoting agents, bite solvents or chemical etchants, lubricants, plasticizers, antioxidants, voiding agents, colorants or tints, roughening agent, slip agent, UV absorbers, refractive index matching material, flame retardant and others well-known in the art.

In a particular embodiment the coated layer can be crosslinked by the use of a suitable cross linking agent such as melamine resins, glycoluril formaldehyde resins, polycarboxylic acids and anhydrides, polyamines, polyimines, epihalohydrins, epoxides, diepoxides, dialdehydes, diols, carboxylic acid halide, ketenes, polyaziridines, isocyanates, carbodiimides, metal carbonates and combinations thereof. Alternatively, the coated layer can be crosslinked by suitable use of radiation such as UV or visible light, electron beam, plasma or corona.

The anti-fog layer or the first and the second adhesive layers can be formed by any method known in the art. Particular methods include coating from a suitable coating composition by any well-known coating method such as rod coating, knife coating, air knife coating, gravure coating, dip coating, slot-die coating, roller coating, knife over roller coating, spray coating, and the like. Other techniques may include inkjet printing, flexographic printing, screen printing, calendaring, lamination, hot melt extrusion, and the like. Alternatively, the layer(s) can be transferred to a receiver member from a donor member by the application of heat and/or pressure.

An important characteristic of the anti-fog layer of the invention for its desirable application in a visor is its high transparency to visible light, as indicated by its high % visible light transmission (% VLT). % VLT is the intensity ratio of the transmitted light to incident light passing through a layer and can be determined by measuring the optical density of the layer using a densitometer (such as an X-rite densitometer) as described in U.S. Pat. No. 7,410,825 or directly by an instrument such as BYK Gardner Haze-Gard Plus. The antifog layer of the invention has a % VLT of at least 40%, preferably at least 50%, more preferably at least 60%, most preferably at least 70% or even at least 90% as measured according to either a densitometer or a BYK Gardner Haze-Gard Plus.

Moreover, the transparent composite, as a whole including all layers integral to the composite can have a high % VLT. In particular embodiments, the transparent composite can have a % VLT of at least 30%, at least 40%, at least 50%, at least 60% or even at least 80%.

Further, the anti-fog layer can have good adhesion to an adjacent layer as measured according to the Scotch Tape test. The Scotch Tape test is described in more detail below in the Examples section. A particular advantage of the present disclosure is that the composites according to the embodiments described herein have good adhesion to the underlying layer. Traditional anti-fog layers suffer from the ability to adhere to underlying substrates, particularly without negatively effecting either the transparency or anti-fogging effects of the anti-fog layer.

Still further, the anti-fog layer can be non-tacky as determined by folding the layer over itself, separating the layer, and observing if the layer stuck to itself. This tackiness characteristic is described in more detail below. A particular advantage of the present disclosure is that the composites according to the embodiments described herein have good adhesion to the underlying layer without being tacky in the layer exposed to the environment. Traditional anti-fog layers suffer from the ability to adhere to underlying substrates while also being non-tacky on the opposite surface.

Moreover, the anti-fog layer can pass a steam bath test. The steam bath test measures the ability of the anti-fog layer to withstand repeated humid environments without deterioration of the anti-fogging effects. A particular advantage of the present disclosure is that the composites according to the embodiments described herein can withstand repeated washing and repeated exposure to humid environments without deterioration of the anti-fogging effects, particularly in a waterborne anti-fog coating composition.

Still further, it is a particular advantage of the present disclosure that the composites described herein do not delaminate during flexing. This attribute can be quantified by a flexing operation in a Gelbo tester for 2000 cycles. In the embodiments described herein, the composites cannot delaminate after 2000 cycles in a Gelbo tester. Traditional composites suffer from delamination when tailoring the composite to have desired anti-fogging effects, transparency, tackiness, and combinations thereof.

The transparent composite of the invention as described herein above may comprise any number of additional functional layers for any purpose. These functional layers may include antistatic layer, primers, adhesion promoting layer, flame retardant layer, barrier layer, breathable layer, conveyance layer, sealable layer, abrasion or scratch resistant layer, hard coat, release layer, slip layer, antireflection layer, refractive index matching layer, UV protective layer, tint layer, tamper-resistant layer, and the like.

EXAMPLES

Embodiments of the disclosure are illustrated with the following Examples, which are illustrative, and do not limit the scope of the present disclosure. The polymeric substrates or layers used in these examples include (1) polyvinyl chloride (PVC) sheets and (2) C-treated fluorinated ethylene propylene (FEP) copolymer sheets.

The constituents used for various layers of the Examples of the invention as well as Comparative samples comprised of the following commercially available materials:

a. Neorez R 9621, a waterborne aliphatic polyurethane dispersion supplied by DSM Neoresins;

b. Neorez R 9330, a waterborne aliphatic polyurethane dispersion supplied by DSM Neoresins;

c. Neorez R 9679, a waterborne aliphatic polyurethane dispersion supplied by DSM Neoresins;

d. Neorez R600, a waterborne aliphatic polyurethane dispersion supplied by DSM Neoresins;

e. Bondthane UD-410, a waterborne aliphatic polyurethane dispersion supplied by BPI;

f. Cymel 303LF, a hexamethoxymethylmelamine compound supplied by Cytech Industries; and g. Zonyl FSO, an ethoxylated nonionic fluorosurfactant supplied by Dupont.

h. Ludox AM, a colloidal silica dispersion supplied by WR Grace i. Capstone FS-61, a fluorinated anionic surfactant supplied by Dupont Adhesive Layer

Example 1

Two Layer Composite

Coating compositions for the adhesive layer described in Table 1A, were coated at various thickness on to C-treated FEP substrates and dried at 93 degrees Celsius for 10 minutes. Subsequently, each of the adhesive coated FEP sheet was laminated to a PVC sheet such that the adhesive layer is between the FEP and the PVC sheet Lamination was done either at a foot press at 40 psi at 121 degrees Celsius or with a hand roller at room temperature (RT). Some of the composites thus prepared were additionally cured at 107 degrees Celsius for various time periods. The peel strength between the FEP sheet and the PVC sheet was determined as pounds per linear inch (PLI) in an Instron following ASTM D1876. The various composite structures, processing details and the corresponding peel strength values are listed in table 1B.

TABLE 1A

| Sample # | Neorez R9621 gms | Neorez R9330 gms | Neorez R9679 gms | Neorez R600 | Cymel 303 gms | water gms | Zonyl FSO gms |
|---|---|---|---|---|---|---|---|
| Adhesive 1 | 65.8 | | | | | 34.2 | 1 |
| Adhesive 2 | 59.2 | | | | 2.5 | 38.3 | 1 |
| Adhesive 3 | 52.6 | | | | 5.0 | 42.4 | 1 |
| Adhesive 4 | | 62.5 | | | | 37.5 | 1 |
| Adhesive 5 | | 56.3 | | | 2.5 | 41.2 | 1 |
| Adhesive 6 | | 50.0 | | | 5.0 | 45.0 | 1 |
| Adhesive 7 | | | 67.6 | | | 32.4 | 1 |
| Adhesive 8 | | | | 75.8 | | 24.2 | 1 |

TABLE 1B

| Composite | Adhesive Sample | Adhesive thickness micrometers | Lamination | Additional Curing | Peel strength PLI |
|---|---|---|---|---|---|
| Composite 1 | Adhesive 1 | 2 | Roller (RT) | 20 min | 6.7 |
| Composite 2 | Adhesive 2 | 2 | Roller (RT) | 20 min | 5.6 |
| Composite 3 | Adhesive 3 | 2 | Roller (RT) | 20 min | 5.3 |
| Composite 4 | Adhesive 1 | 2 | Foot press; 15 sec | — | 4.3 |
| Composite 5 | Adhesive 4 | 2 | Roller (RT) | 2 min | 2.4 |
| Composite 6 | Adhesive 4 | 2 | Roller (RT) | 3 min | 2.6 |
| Composite 7 | Adhesive 4 | 2 | Roller (RT) | 5 min | 3.2 |
| Composite 8 | Adhesive 4 | 2 | Roller (RT) | 20 min | 5.2 |
| Composite 9 | Adhesive 4 | 6 | Roller (RT) | 2 min | 3.6 |
| Composite 10 | Adhesive 4 | 6 | Roller (RT) | 3 min | 3.6 |
| Composite 11 | Adhesive 4 | 6 | Roller (RT) | 5 min | 3.5 |
| Composite 12 | Adhesive 5 | 2 | Roller (RT) | 20 min | 5.4 |
| Composite 13 | Adhesive 6 | 2 | Roller (RT) | 20 min | 5.4 |
| Composite 14 | Adhesive 7 | 2 | Roller (RT) | 2 min | 0 |
| Composite 15 | Adhesive 7 | 2 | Roller (RT) | 3 min | 0 |
| Composite 16 | Adhesive 7 | 2 | Roller (RT) | 5 min | 0 |
| Composite 17 | Adhesive 7 | 2 | Roller (RT) | 20 min | 0 |
| Composite 18 | Adhesive 8 | 2 | Roller (RT) | 2 min | 0.5 |
| Composite 19 | Adhesive 8 | 2 | Roller (RT) | 3 min | 0.7 |
| Composite 20 | Adhesive 8 | 2 | Roller (RT) | 5 min | 0.6 |

As illustrated above Adhesive combinations Adhesive 1 through Adhesive 6 resulted in peel strength value at least 2 PLI.

Furthermore, each composite utilizing Adhesive 1 through Adhesive 6 was bent, folded and flexed and did not delaminate. On the other hand, composites produced with Adhesive 7 through Adhesive 8 provided little to no adhesion. In fact, an integral composite that can be bent, folded or flexed without delamination could not be created using Adhesives 7 through Adhesive 8.

Example 2

Three Layer Composite Based on Adhesive 4

Two FEP sheets, which have been C-treated on both sides, were each coated on both sides with Adhesive 4 as outlined in Table A1 and dried at 93 degrees Celsius for 10 minutes. Each adhesive coated FEP sheet was laminated between two PVC sheets with a hand roller at room temperature (RT), followed by 5 minutes of curing at 107 degrees Celsius, to create the following composites outlined in Table 2 below. Further, each composite was subjected to flexing in a Gelbo apparatus for 2000 cycles and checked for delamination.

TABLE 2

| Sample No. | Composite Structure | Thickness of Adhesive Layer | Delaminated |
|---|---|---|---|
| Composite B1 | PVC/Adhesive 4/FEP/Adhesive 4/PVC | 2 micrometers | No |
| Composite B2 | PVC/Adhesive 4/FEP/Adhesive 4/PVC | 8 micrometers | No |

Example 3

Anti-Fog Layer

Anti-fog coating compositions as described in Table 3 below were coated on Composites B1 and B2 over the surface of one of the PVC layers. Further, the anti-fog coating composition was applied directly to a stand-alone C-treated FEP sheet.

TABLE 3

| Coating | Bondthane UD 410 gms | Neorez R9330 gms | Neorez R9679 gms | Cymel 303 gms | Ludox AM gms | water gms | Zonyl FSO gms | Capstone FS-61 gms |
|---|---|---|---|---|---|---|---|---|
| Anti-fog 1 | 48.6 | 17 | 27.6 | 5 | — | 1.8 | 1 | |
| Anti-fog 2 | 48.6 | 17 | 27.6 | — | — | 6.8 | 1 | |
| Anti-fog 3 | 71.4 | — | — | — | — | 28.6 | 1 | |
| Anti-fog 4 | 57.1 | 6.2 | 6.8 | — | — | 29.9 | 1 | |
| Anti-fog 5 | 35.7 | 6.2 | 27 | 3.8 | — | 27.3 | 1 | |
| Anti-fog 6 | 43.7 | 15.3 | 24.8 | — | 11.3 | 4.8 | — | 0.1 |

Performance Tests

Transparency—

The samples described above having an anti-fog layer coated thereon was evaluated for % VLT. Samples with % VLT of at least 50% was considered "high" and otherwise "low."

Adhesion—

Samples with anti-fog layer were evaluated for adhesion of the anti-fog layer to the immediately preceding layer with Scotch tape. Any removal of material was deemed "poor" whereas no removal was deemed "good."

Tackiness—

Samples with anti-fog layer were evaluated for tackiness by folding the layer over itself and separating it. If the layer stuck to itself it was considered "tacky." Otherwise, it was considered "non-tacky."

Anti-Fog Capability—

Samples of anti-fog layer were exposed to a steam bath with water temperature at 80 degrees Celsius for 15 second and evaluated for anti-fogging characteristics. The steamed sample was subsequently washed with a clean rag in soap and warm water and dried. After drying the sample was exposed to steam again in the aforesaid manner. The cycle of exposure to steam followed by washing was continued for 15 times, and the sample was checked for any removal of material or loss of anti-fogging characteristics. The anti-fog layers of the invention "passed" this test without showing any removal of material or loss of anti-fogging characteristics during or at the end of the cycles.

Delamination—

The anti-fog coated composite was subjected to flexing in a Gelbo tester for 2000 cycles and evaluated for delamination. The sample is considered to have "passed" the test, if there was no delamination detected in any of the layers.

The test results are summarized below in Table 2B.

TABLE 2B

| # | Anti-fog Coating | Composite | Transparency | adhesion | tackiness | Steam/ clean cycle | Gelbo |
|---|---|---|---|---|---|---|---|
| 1 | Anti-fog 1 | Composite B1 (PVC surface) | high | good | Non-tacky | passed | passed |
| 2 | Anti-fog 1 | FEP sheet | high | good | Non-tacky | passed | passed |
| 3 | Anti-fog 2 | Composite B2 (PVC surface) | high | good | Non-tacky | | passed |
| 4 | Anti-fog 3 | Composite 1 (PVC surface) | high | | tacky | | |
| 5 | Anti-fog 4 | Composite 1 (PVC surface) | high | | tacky | | |
| 6 | Anti-fog 5 | Composite 1 (PVC surface) | high | poor | | | |
| 7 | Anti-fog 6 | Composite B2 (PVC surface) | high | good | Non-tacky | passed | |

As shown above, Samples 1-3 and 7 resulted in composite visors exhibiting high transparency, good adhesion, non-tacky surface, good flexibility, good washability and maintain good anti-fog performance. On the other hand, samples 4-6 provided poor adhesion or a tacky surface, and deemed undesirable for visor applications.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A transparent composite comprising: a substrate layer; and an anti-fog layer, wherein the anti-fog layer comprises an adhesive polymer, a hard polymer, and a hydrophilic polymer, wherein the adhesive polymer, hard polymer, and hydrophilic polymers are different.

Item 2. A transparent composite comprising: a substrate layer; a first adhesive layer; a first transparent layer; a second adhesive layer; a second transparent layer; and an anti-fog layer comprising an adhesive polymer, a hard polymer, and a hydrophilic polymer, wherein the adhesive polymer, hard polymer, and hydrophilic polymer are different.

Item 3. An anti-fog coating composition comprising an adhesive polymer, a hard polymer, and a hydrophilic polymer, wherein the adhesive polymer, hard polymer, and hydrophilic polymer are different.

Item 4. The transparent composite according to any one of the preceding items, wherein the adhesive polymer comprises a polymer having a Tg of less than about 45 degrees Celsius; wherein the hard polymer comprises a polymer having a pencil hardness of at least H as measured according to ASTM D3363; and wherein the hydrophilic polymer comprises a polymer having a backbone and hydrophilic segments covalently bonded to the backbone.

Item 5. The transparent composite or coating composition according to any one of the preceding items, wherein the anti-fog layer or anti-fog coating composition comprises a hydrophilic polymer.

Item 6. The transparent composite or coating composition according to item 4, wherein the hydrophilic polymer comprises a hydrophilic polyurethane.

Item 7. The transparent composite or coating composition according to any one of items 5 to 6, wherein the hydrophilic polymer comprises a polymer having a polyurethane backbone and hydrophilic segments covalently bonded to the polyurethane backbone.

Item 8. The transparent composite or coating composition according to item 7, wherein the hydrophilic segments comprise alkylene oxides, lactones, lactams, silanes, acrylamides, alcohols, gelatin, or combinations thereof.

Item 9. The transparent composite or coating composition according to any one of items 7 to 8, wherein the hydrophilic segments comprise alkylene oxides, lactones, lactams, or combinations thereof.

Item 10. The transparent composite or coating composition according to any one of items 7 to 9, wherein the hydrophilic segments have a molecular weight of at least about 100, at least about 500, or even at least about 1000.

Item 11. The transparent composite or coating composition according to any one of items 7 to 10, wherein the hydrophilic segments comprise at least about 1 wt %, at least about 10 wt %, or even at least about 25 wt % by weight of the hydrophilic polymer.

Item 12. The transparent composite or coating composition according to any one of items 5 to 11, wherein the hydrophilic polymer is present in the anti-fog layer in an amount of no greater than about 99.9 wt %, no greater than about 90 wt %, no greater than about 80 wt %, or even no greater than about 70 wt % based on the total dry weight of the anti-fog layer or coating composition.

Item 13. The transparent composite or coating composition according to any one of items 5 to 12, wherein the hydrophilic polymer is present in the anti-fog layer in an amount of at least about 0.01 wt %, at least about 10 wt %, at least about 20 wt %, or even at least about 25 wt % based on the total dry weight of the anti-fog layer or coating composition.

Item 14. The transparent composite or coating composition according to any one of items 5 to 13, wherein the hydrophilic polymer is present in the anti-fog layer in an amount within a range of about 0.01 wt % to about 99.9 wt %, about 10 wt % to about 90 wt %, about 20 wt % to about 80 wt %, or even about 25 wt % to about 75 wt % based on the total dry weight of the anti-fog layer or coating composition.

Item 15. The transparent composite according to any one of the preceding items, wherein the anti-fog layer or anti-fog coating composition comprises a hard polymer.

Item 16. The transparent composite or coating composition according to item 15, wherein the hard polymer comprises a polymer or interpolymer prepared from ethylenically unsaturated monomers comprising styrene, styrene derivatives, acrylic acid or its derivate, methacrylic acid or its derivate, olefins, (meth)acrylonitriles, itaconic acid and its derivatives, maleic acid and its derivatives, vinyl halides, vinylidene halides, fluoropolymers, or combinations thereof.

Item 17. The transparent composite or coating composition according to any one of items 15 to 16, wherein the hard polymer comprises a polymer prepared from an aqueous dispersion of condensation polymers.

Item 18. The transparent composite or coating composition according to any one of items 15 to 17, wherein the hard polymer comprises a polyurethane, a polyester, or combinations thereof.

Item 19. The transparent composite according to any one of items 15 to 18, wherein the hard polymer comprises a polymer prepared from a polyurethane dispersion, a polyester dispersion, or combinations thereof.

Item 20. The transparent composite or coating composition according to any one of items 15 to 19, wherein the hard polymer has a pencil hardness of at least about H, at least about 2H, at least about 3H as measured according to ASTM D3363.

Item 21. The transparent composite or coating composition according to any one of items 15 to 20, wherein the hard polymer has a 100% modulus of at least about 2000 psi, at least about 3000 psi, or even at least about 3500 psi as measured according to ASTM D412.

Item 22. The transparent composite or coating composition according to any one of the items 15 to 21, wherein the hard polymer has a 100% modulus of no greater than about 15000 psi, no greater than about 10000 psi, or even no greater than about 7500 psi as measured according to ASTM D412.

Item 23. The transparent composite or coating composition according to any one of items 15 to 22, wherein the hard polymer has a tensile strength of at least about 3000 psi, at least about 4000 psi, or even at least about 5000 psi as measured according to ASTM D412.

Item 24. The transparent composite or coating composition according to any one of items 15 to 23, wherein the hard polymer has a tensile strength of no greater than about 15000 psi as measured according to ASTM D412.

Item 25. The transparent composite or coating composition according to any one of items 15 to 24, wherein the hard polymer is present in the anti-fog layer in an amount of no greater than about 90 wt %, no greater than about 80 wt %, no greater than about 70 wt %, or even no greater than about 60 wt % based on the total dry weight of the anti-fog layer or coating composition.

Item 26. The transparent composite or coating composition according to any one of items 15 to 25, wherein the hard polymer is present in an amount of at least about 0.1 wt %, at least about 10 wt %, at least about 20 wt %, or even at least about 25 wt % based on the total dry weight of the anti-fog layer or coating composition.

Item 27. The transparent composite or coating composition according to any one of the items 15 to 26, wherein the hard polymer is present in an amount within a range of about 0.1 wt % to about 90 wt %, about 10 wt % to about 80 wt %, about 20 wt % to about 70 wt %, or even about 25 wt % to about 60 wt % based on the total dry weight of the anti-fog layer or coating composition.

Item 28. The transparent composite or coating composition according to any one of the preceding items, wherein the anti-fog layer or coating composition comprises an adhesive polymer.

Item 29. The transparent composite or coating composition according to item 28, wherein the adhesive polymer comprises a polyester or a polyurethane.

Item 30. The transparent composite or coating composition according to any one items 28 to 29, wherein the adhesive polymer comprises an aliphatic, non-ionic polyurethane.

Item 31. The transparent composite or coating composition according to any one of items 28 to 30, wherein the adhesive polymer is present in an amount of no greater than about 90 wt %, no greater than about 80 wt %, no greater than about 70 wt %, or even no greater than about 60 wt % based on the total dry weight of the anti-fog layer or coating composition.

Item 32. The transparent composite or coating composition according to any one of items 28 to 31, wherein adhesive polymer is present in an amount of at least about 0.1 wt %, at least about 10 wt %, at least about 20 wt %, or even at least about 25 wt % based on the total dry weight of the anti-fog layer or coating composition.

Item 33. The transparent composite or coating composition according to any one of items 28 to 32, wherein the adhesive polymer is present in an amount within a range of about 0.1 wt % to about 90 wt %, about 10 wt % to about 80 wt %, about 20 wt % to about 70 wt %, or even about 25 wt % to about 60 wt % based on the total dry weight of the anti-fog layer or coating composition.

Item 34. The transparent composite or coating composition according to any one of items 28 to 33, wherein the adhesive polymer comprises a polymer or interpolymer prepared from ethylenically unsaturated monomers selected from the group consisting of styrene, styrene derivatives, acrylic acid or its derivate, methacrylic acid or its derivate, olefins, (meth)acrylonitriles, itaconic acid and its derivatives, maleic acid and its derivatives, vinyl halides, vinylidene halides, fluoropolymers, and combinations thereof.

Item 35. The transparent composite or coating composition according to any one of items 28 to 34, wherein the adhesive polymer comprises a polymer or interpolymer prepared from a fluoropolymer, and wherein the fluoropolymer is selected from the group consisting of PTFE, FPA, FEP, THV, ETFE, PVDF, and combinations thereof.

Item 36. The transparent composite or coating composition according to any one of items 28 to 35, wherein the adhesive polymer comprises a polymer prepared from an aqueous dispersion of condensation polymers.

Item 37. The transparent composite or coating composition according to any one of items 28 to 36, wherein the adhesive polymer comprises a polymer prepared from a polyurethane or polyester dispersion.

Item 38. The transparent composite or coating composition according to any one of the preceding items, wherein the anti-fog layer or coating composition further comprises a crosslinker.

Item 39. The transparent composite or coating composition according to any one of the preceding items, wherein the anti-fog layer or coating composition further comprises a cross-linked network of polymers comprising a hard polymer, a hydrophilic polymer, and an adhesive polymer.

Item 40. The transparent composite or coating composition according to any one of the preceding items, wherein the anti-fog layer or coating composition further comprises an additive selected from the group consisting of surfactants, defoamers, coating aids, charge control agents, conductive particles, conductive polymers, thickeners, viscosity modifiers, coalescing aids, soluble and/or solid particle dyes, antifoggants, inorganic or organic fillers, matte beads, inorganic or polymeric particles, adhesion promoting agents, bite solvents, chemical etchants, lubricants, plasticizers, antioxidants, voiding agents, colorants, tints, roughening agents, slip agents, UV absorbers, refractive index matching materials, and combinations thereof.

Item 41. The transparent composite according to any one of the preceding items, further comprising a first transparent layer disposed adjacent the substrate layer.

Item 42. The transparent composite according to item 41, wherein the first transparent layer comprises a fluoropolymer.

Item 43. The transparent composite according to any one of items 41 to 42, wherein the first transparent layer comprises a C-treated fluoropolymer.

Item 44. The transparent composite according to any one of items 41 to 43, further comprising a second transparent layer disposed adjacent the first transparent layer.

Item 45. The transparent composite according to item 44, wherein the second transparent layer comprises a fluoropolymer or polyvinyl chloride, or polyester, or polycarbonate, or cellulose acetate, or polyolefin.

Item 46. The transparent composite according to any one of items 44 to 45, wherein the second transparent layer comprises a C-treated fluoropolymer.

Item 47. The transparent composite according to any one of items 41 to 46, wherein the first transparent layer and the second transparent layer comprise the same polymer material.

Item 48. The transparent composite according to any one of the preceding items, wherein the transparent composite comprises a first adhesive layer disposed between the first transparent layer and the substrate layer; and a second adhesive layer disposed between the second transparent layer and the first transparent layer.

Item 49. The transparent composite according to item 48, wherein the first adhesive layer, or the second adhesive layer comprises a polyurethane polymer.

Item 50. The transparent composite according to any one of items 48 to 49, wherein the first adhesive layer, or the second adhesive layer comprise a cured, crosslinked waterborne aliphatic polyurethane dispersion.

Item 51. The transparent composite according to any one of items 48 to 50, wherein the first adhesive layer, or the second adhesive layer comprise the same adhesive polymer as in the anti-fog layer.

Item 52. The transparent composite according to any one of items 48 to 51, wherein the first adhesive layer, or the second adhesive layer comprise a water soluble polymer, a hydrophilic colloid or a water insoluble polymer in the form of a latex or a dispersion.

Item 53. The transparent composite according to any one of items 48 to 52, wherein the first adhesive layer, or the second adhesive layer comprise polymers and interpolymers prepared from ethylenically unsaturated monomers such as styrene, styrene derivatives, acrylic acid or its derivate, methacrylic acid or its derivate, olefins, (meth)acrylonitriles, itaconic acid and its derivatives, maleic acid and its derivatives, vinyl halides, vinylidene halides, or fluoropolymers.

Item 54. The transparent composite according to any one of items 48 to 53, wherein the first adhesive layer, or the second adhesive layer comprise a polymer prepared from an aqueous dispersion of condensation polymers.

Item 55. The transparent composite according to any one of items 48 to 54, wherein the first adhesive layer, or the second adhesive layer comprise a polymer prepared from a polyurethane or polyester dispersion.

Item 56. The transparent composite according to any one of items 48 to 55, the first adhesive layer, or the second adhesive layer comprise a polymer having a glass transition temperature (Tg) of no greater than 45 degrees Celsius, no greater than 20 degrees Celsius, no greater than 10 degrees Celsius, or even no greater than 0 degrees Celsius.

Item 57. The transparent composite according to any one of the preceding items, wherein the composite comprises a substrate layer.

Item 58. The transparent composite according to any one of the preceding items, wherein the composite comprises a freestanding transparent substrate layer.

Item 59. The transparent composite according to any one of the preceding items, wherein the composite comprises a substrate layer comprising a polyvinyl chloride, a polyester, a fluoropolymer, a polycarbonate, or a polyolefin.

Item 60. The transparent composite according to any one of the preceding items, wherein a peel strength between the first transparent layer and substrate layer is at least about 2 pounds per linear inch (PLI), at least about 3 PLI, at least about 4 PLI, or even at least about 5 PLI as measured according to ASTM D1876.

Item 61. The transparent composite according to any one of the preceding items, wherein a peel strength between the second transparent layer and the first transparent layer is at least about 2 pounds per linear inch (PLI), at least about 3 PLI, at least about 4 PLI, or even at least about 5 PLI as measured according to ASTM D1876.

Item 62. The transparent composite according to any one of the preceding items, wherein a bond between the outer layer and layer comprising a fluoropolymer has a bond strength of at least about 2 pounds per linear inch (PLI), at least about 3 PLI, at least about 4 PLI, or even at least about 5 PLI as measured according to ASTM D1876; and wherein a bond between the layer comprising a fluoropolymer and the layer comprising a polymer has a bond strength of at least about 2 pounds per linear inch (PLI), at least about 3 PLI, at least about 4 PLI, or even at least about 5 PLI as measured according to ASTM D1876.

Item 63. The transparent composite according to any one of the preceding items, wherein the anti-fog layer has good adhesion to an adjacent layer as measured according to the Scotch Tape test.

Item 64. The transparent composite according to any one of the preceding items, wherein the anti-fog layer is non-tacky as determined by folding the layer over itself, separating the layer, and observing if the layer stuck to itself.

Item 65. The transparent composite according to any one of the preceding items, wherein the anti-fog layer passes a steam bath test.

Item 66. The transparent composite according to any one of the preceding items, wherein the composite does not delaminate as determined by flexing in a Gelbo tester for 2000 cycles.

Item 67. The transparent composite according to any one of the preceding items, wherein the anti-fog layer has % VLT of at least 50%, or at least 70%, or even at least 90%.

Item 68. A transparent composite comprising an anti-fog layer, wherein the anti-fog layer comprises a hydrophilic polymer and an anti-blocking agent comprising colloidal silica and/or an anionic fluorinated surfactant.

Item 69. An anti-fog coating composition comprising a hydrophilic polymer and an anti-blocking agent comprising colloidal silica and/or an anionic fluorinated surfactant.

Item 70. The transparent composite or coating composition according to any one of the preceding items, wherein the anti-fog coating composition and/or layer comprises an anti-blocking agent.

Item 71. The transparent composite or coating composition according to any one of the preceding items, wherein the anti-fog coating composition and/or layer comprises an anti-blocking agent comprising colloidal inorganic particles.

Item 72. The transparent composite or coating composition according to any one of the preceding items, wherein the anti-fog coating composition and/or layer comprises an anti-blocking agent comprising colloidal silica.

Item 73. The transparent composite or coating composition according to any one of the preceding items, wherein the anti-fog coating composition and/or layer comprises an anti-blocking agent comprising a fluorinated surfactant.

Item 74. The transparent composite or coating composition according to any one of the preceding items, wherein the anti-fog coating composition and/or layer comprises an anti-blocking agent comprising an anionic fluorinated surfactant.

Item 75. The transparent composite or coating composition according to any one of the preceding items, wherein the anti-fog coating composition and/or layer comprises an anti-blocking agent comprising a colloidal silica present in the anti-fog coating composition or the anti-fog layer in an amount of at least about 1 wt. %, at least about 3 wt. %, or even at least about 7 wt. %, based on the total weight of the anti-fog coating composition or the anti-fog layer.

Item 76. The transparent composite or coating composition according to any one of the preceding items, wherein the anti-fog coating composition and/or layer comprises an anti-blocking agent comprising a colloidal silica present in the anti-fog coating composition or the anti-fog layer in an amount of no greater than about 50 wt. %, no greater than about 40 wt. %, no greater than about 30 wt. %, or even no greater than about 20 wt. %.

Item 77. The transparent composite or coating composition according to any one of the preceding items, wherein the anti-fog coating composition and/or layer comprises an anti-blocking agent comprising a colloidal silica present in the anti-fog coating composition or the anti-fog layer in an amount in a range of from about 1 wt. % to about 50 wt. %, about 3 wt. % to about 40 wt. %, or even about 7 wt. % to about 30 wt. %.

Item 78. The transparent composite or coating composition according to any one of the preceding items, wherein the anti-fog coating composition and/or layer comprises an anti-blocking agent comprising a fluorinated anionic surfactant present in the anti-fog coating composition or the anti-fog layer in an amount of at least about 0.005 wt. %, at least about 0.01 wt. %, or even at least about 0.03 wt. %, based on the total weight of the anti-fog coating composition or the anti-fog layer.

Item 79. The transparent composite or coating composition according to any one of the preceding items, wherein the anti-fog coating composition and/or layer comprises an anti-blocking agent comprising a fluorinated anionic surfactant present in the anti-fog coating composition or the anti-fog layer in an amount of no greater than about 15 wt. %, no greater than about 10 wt. %, no greater than about 8 wt. %, or even no greater than about 2 wt. %.

Item 80. The transparent composite or coating composition according to any one of the preceding items, wherein the anti-fog coating composition and/or layer comprises an anti-blocking agent comprising a fluorinated anionic surfactant present in the anti-fog coating composition or the anti-fog layer in an amount in a range of from about 0.005 wt. % to about 15 wt. %, about 0.01 wt. % to about 10 wt. %, or even about 0.03 wt. % to about 8 wt. %.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An anti-fog coating composition comprising an adhesive polymer, a hard polymer, and a hydrophilic polymer, wherein the adhesive polymer, hard polymer, and hydrophilic polymer are different, and the hard polymer has an elongation at break of at least 100% as measured according to ASTM D412, and a pencil hardness of at least 2H as measured according to ASTM D3363.

2. The anti-fog coating composition according to claim 1, wherein the adhesive polymer comprises a polymer having a Tg of less than about 45 degrees Celsius; and wherein the hydrophilic polymer comprises a polymer having a backbone and hydrophilic segments covalently bonded to the backbone.

3. The anti-fog coating composition according to claim 1, wherein the hydrophilic polymer comprises a polymer having a polyurethane backbone and hydrophilic segments covalently bonded to the polyurethane backbone wherein the hydrophilic segments comprise alkylene oxides, lactones, lactams, or combinations thereof.

4. The anti-fog coating composition according to claim 1, wherein:
the hydrophilic polymer is present in the anti-fog coating composition in an amount within a range of about 10 wt % to about 90 wt % based on the total dry weight of the anti-fog coating composition;
the hard polymer is present in the anti-fog coating composition in an amount within a range of about 10 wt % to about 80 wt % based on the total dry weight of the anti-fog coating composition; and
the adhesive polymer is present in the anti-fog coating composition in an amount within a range of about 10 wt % to about 80 wt % based on the total dry weight of the anti-fog coating composition.

5. The anti-fog coating composition according to claim 1, wherein the hard polymer comprises a polymer or interpolymer prepared from ethylenically unsaturated monomers comprising styrene, styrene derivatives, acrylic acid or its derivate, methacrylic acid or its derivate, olefins, (meth) acrylonitriles, itaconic acid and its derivatives, maleic acid and its derivatives, vinyl halides, vinylidene halides, fluoropolymers, or combinations thereof.

6. The anti-fog coating composition according to claim 1, wherein the adhesive polymer comprises a polyester or a polyurethane.

7. The anti-fog coating composition according to claim 1, wherein the anti-fog coating composition further comprises a crosslinker.

8. A transparent composite comprising:
a substrate layer; and
an anti-fog layer, wherein the anti-fog layer comprises an adhesive polymer, a hard polymer, and a hydrophilic polymer, wherein the adhesive polymer, hard polymer, and hydrophilic polymers are different, and the hard polymer has an elongation at break of at least 100% as measured according to ASTM D412, and a pencil hardness of at least 2H as measured according to ASTM D3363.

9. The transparent composite according to claim 8, wherein the transparent composite further comprises:
   a first adhesive layer;
   a first transparent layer;
   a second adhesive layer; and
   a second transparent layer.

10. The transparent composite according to claim 8, wherein the transparent composite is in the form of personal protective equipment.

11. The transparent composite according to claim 9, wherein a peel strength between the first transparent layer and substrate layer is at least about 2 pounds per linear inch (PLI) as measured according to ASTM D1876.

12. The transparent composite according to claim 8, wherein the anti-fog layer is non-tacky as determined by folding the layer over itself, separating the layer, and observing if the layer stuck to itself.

13. The transparent composite according to claim 8, wherein
   the anti-fog layer comprises an anti-blocking agent comprising a colloidal silica present in the anti-fog layer in a range of from about 3 wt. % to about 40 wt. % based on the total weight of the anti-fog layer; and/or
   wherein the anti-fog layer comprises an anti-blocking agent comprising a fluorinated anionic surfactant present in the anti-fog layer in an amount in a range of from about 0.01 wt. % to about 10 wt. % based on the total weight of the anti-fog layer.

14. The transparent composite according to claim 8, wherein the adhesive polymer comprises a polymer having a Tg of less than about 45 degrees Celsius; and wherein the hydrophilic polymer comprises a polymer having a backbone and hydrophilic segments covalently bonded to the backbone.

15. The transparent composite according to claim 8, wherein:
   the hydrophilic polymer is present in the anti-fog layer in an amount within a range of about 10 wt % to about 90 wt % based on the total dry weight of the anti-fog layer;
   the hard polymer is present in the anti-fog layer in an amount within a range of about 10 wt % to about 80 wt % based on the total dry weight of the anti-fog layer; and
   the adhesive polymer is present in the anti-fog layer in an amount within a range of about 10 wt % to about 80 wt % based on the total dry weight of the anti-fog layer.

16. The transparent composite according to claim 8, wherein the hydrophilic polymer comprises a polymer having a polyurethane backbone and hydrophilic segments covalently bonded to the polyurethane backbone wherein the hydrophilic segments comprise alkylene oxides, lactones, lactams, or combinations thereof.

17. The transparent composite according to claim 8, wherein the hard polymer comprises a polymer or interpolymer prepared from ethylenically unsaturated monomers comprising styrene, styrene derivatives, acrylic acid or its derivate, methacrylic acid or its derivate, olefins, (meth) acrylonitriles, itaconic acid and its derivatives, maleic acid and its derivatives, vinyl halides, vinylidene halides, fluoropolymers, or combinations thereof.

18. The transparent composite according to claim 8, wherein the adhesive polymer comprises a polyester or a polyurethane.

19. The transparent composite according to claim 8, wherein the anti-fog layer further comprises a crosslinker.

* * * * *